US012649957B2

(12) United States Patent
Yashiki et al.

(10) Patent No.: US 12,649,957 B2
(45) Date of Patent: *Jun. 9, 2026

(54) NON-ORIENTED ELECTRICAL STEEL SHEET AND METHOD FOR MANUFACTURING THE SAME

(71) Applicant: NIPPON STEEL CORPORATION, Tokyo (JP)

(72) Inventors: Hiroyoshi Yashiki, Tokyo (JP); Yoshiaki Natori, Tokyo (JP); Kazutoshi Takeda, Tokyo (JP); Ichiro Tanaka, Tokyo (JP); Yoshihiro Arita, Tokyo (JP); Hiroki Hori, Tokyo (JP); Wataru Ohashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 105 days.

This patent is subject to a terminal disclaimer.

(21) Appl. No.: 18/284,765

(22) PCT Filed: Mar. 31, 2022

(86) PCT No.: PCT/JP2022/016425
§ 371 (c)(1),
(2) Date: Sep. 28, 2023

(87) PCT Pub. No.: WO2022/211004
PCT Pub. Date: Oct. 6, 2022

(65) Prior Publication Data

US 2024/0084415 A1 Mar. 14, 2024

(30) Foreign Application Priority Data

Apr. 2, 2021 (JP) ................................ 2021-063642

(51) Int. Cl.
*C21D 9/46* (2006.01)
*C21D 6/00* (2006.01)
(Continued)

(52) U.S. Cl.
CPC ............... *C21D 9/46* (2013.01); *C21D 6/005* (2013.01); *C21D 6/008* (2013.01); *C21D 8/1222* (2013.01);
(Continued)

(58) Field of Classification Search
CPC ........ C21D 8/1266; C21D 9/46; C22C 38/02; C22C 38/004; C22C 38/06; C22C 38/04
See application file for complete search history.

(56) References Cited

U.S. PATENT DOCUMENTS 9,570,219 B2 2/2017 Natori et al.
12,148,555 B2 * 11/2024 Yashiki ................ C22C 38/001
(Continued)

FOREIGN PATENT DOCUMENTS

JP 2002-146491 A 5/2002
JP 2003-105508 A 4/2003
(Continued)

OTHER PUBLICATIONS

Machine translation of KR20190078361A, published 2019, Powered by EPO and Google. (Year: 2019).*
(Continued)

*Primary Examiner* — Monique R Jackson
(74) *Attorney, Agent, or Firm* — Birch, Stewart, Kolasch & Birch, LLP

(57) ABSTRACT

This non-oriented electrical steel sheet includes a base material having a chemical composition including Si: 3.7 to 4.8%, wherein a recrystallization rate is less than 100% in terms of an area fraction, the following Formula (i) and Formula (ii) are satisfied, and the tensile strength is more than 700 MPa.

(Continued)

$4.3 \leq Si + sol.\ Al + 0.5 \times Mn \leq 4.9$ (i)

$(B_{50}(0°) + 2 \times B_{50}(45°) + B_{50}(90°))/4 \geq 1.57$ (ii)

8 Claims, 2 Drawing Sheets

(51) Int. Cl.

| | |
|---|---|
| ***C21D 8/12*** | (2006.01) |
| ***C21D 8/1216*** | (2026.01) |
| ***C21D 8/1244*** | (2026.01) |
| ***C21D 8/1277*** | (2026.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/12*** | (2006.01) |
| ***C22C 38/14*** | (2006.01) |
| ***C22C 38/16*** | (2006.01) |
| ***C22C 38/60*** | (2006.01) |
| ***H01F 1/147*** | (2006.01) |

(52) U.S. Cl.

CPC ......... *C21D 8/1233* (2013.01); *C21D 8/1261* (2013.01); *C21D 8/1266* (2013.01); *C21D 8/1272* (2013.01); *C21D 8/1283* (2013.01); *C22C 38/001* (2013.01); *C22C 38/004* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/60* (2013.01); *H01F 1/14783* (2013.01); *C21D 6/001* (2013.01)

(56) References Cited

U.S. PATENT DOCUMENTS

| | | | | |
|---|---|---|---|---|
| 2006/0124207 | A1 | 6/2006 | Takashima et al. | |
| 2008/0238237 | A1* | 10/2008 | Nishihama | H02K 17/20 310/216.004 |
| 2010/0158744 | A1 | 6/2010 | Murakami | |
| 2011/0073223 | A1 | 3/2011 | Sohn et al. | |
| 2012/0321502 | A1 | 12/2012 | Shimazu et al. | |
| 2013/0167987 | A1* | 7/2013 | Kim | C22C 38/04 148/309 |
| 2013/0306200 | A1 | 11/2013 | Kohno et al. | |
| 2014/0366988 | A1 | 12/2014 | Dorninger et al. | |
| 2015/0187475 | A1 | 7/2015 | Zaizen et al. | |
| 2015/0357101 | A1* | 12/2015 | Zaizen | C21D 9/46 148/111 |
| 2017/0117758 | A1* | 4/2017 | Nakagawa | B32B 15/011 |
| 2017/0194082 | A1* | 7/2017 | Murakami | H01F 41/0233 |
| 2017/0274432 | A1 | 9/2017 | Okubo et al. | |
| 2018/0358846 | A1* | 12/2018 | Baba | H01F 7/0221 |
| 2019/0189318 | A1 | 6/2019 | Uesaka et al. | |
| 2019/0330708 | A1* | 10/2019 | Okubo | C22C 38/60 |
| 2019/0345576 | A1* | 11/2019 | Park | C22C 38/02 |
| 2020/0040423 | A1 | 2/2020 | Natori et al. | |
| 2020/0087750 | A1* | 3/2020 | Lee | H01F 1/16 |
| 2021/0159002 | A1* | 5/2021 | Okubo | C22C 38/14 |
| 2021/0292863 | A1* | 9/2021 | Fujimura | H01F 41/0233 |
| 2021/0343458 | A1 | 11/2021 | Yashiki et al. | |
| 2021/0371948 | A1 | 12/2021 | Zaizen et al. | |
| 2021/0399594 | A1* | 12/2021 | Fujimura | H02K 1/06 |
| 2022/0064751 | A1 | 3/2022 | Okubo et al. | |

FOREIGN PATENT DOCUMENTS

| | | | | | |
|---|---|---|---|---|---|
| JP | 2004-300535 | A | | 10/2004 | |
| JP | 2006-144036 | A | | 6/2006 | |
| JP | 2007-186791 | A | | 7/2007 | |
| JP | 2010-90474 | A | | 4/2010 | |
| JP | 2011-84761 | A | | 4/2011 | |
| JP | 2011-246810 | A | | 12/2011 | |
| JP | 2012-140676 | A | | 7/2012 | |
| JP | 2013-91837 | A | | 5/2013 | |
| JP | 5375149 | B2 | | 12/2013 | |
| JP | 2018-21242 | A | | 2/2018 | |
| KR | 20190078361 | A | * | 7/2019 | C21D 8/1222 |
| TW | 201726944 | A | | 8/2017 | |
| WO | WO 2019/017426 | A1 | | 1/2019 | |
| WO | WO 2020/090160 | A1 | | 5/2020 | |
| WO | WO 2020/091039 | A1 | | 5/2020 | |
| WO | WO 2020/153387 | A1 | | 7/2020 | |

OTHER PUBLICATIONS

Machine translation of JP2010-0090474A, published Apr. 2010, Powered by EPO and Google. (Year: 2010).*

"Metallic materials—Tensile testing—Method of test at room temperature", JIS Z 2241, 2011, total 37 pages.

"Test methods for electrical steel strip and sheet—Part 1: Methods of measurement of the magnetic properties of electrical steel strip and sheet by means of an Epstein frame", JIS C: 2550-1, 2011, total 22 pages.

Bahrim et al., "The Non Metallic Inclusion Study in Car Steel Samples and Determination of Aluminum and Calcium Soluble/Insoluble Part," Journal of Science and Arts, vol. 14, No. 1, 2011, pp. 69-74.

U.S. Notice of Allowance for U.S. Appl. No. 17/259,837, dated Jul. 19, 2024.

U.S. Office Action for U.S. Appl. No. 17/259,837, dated Apr. 3, 2024.

U.S. Office Action for U.S. Appl. No. 17/259,837, dated Aug. 16, 2023.

U.S. Office Action for U.S. Appl. No. 17/259,837, dated Nov. 28, 2023.

* cited by examiner

NON-ORIENTED ELECTRICAL STEEL SHEET AND METHOD FOR MANUFACTURING THE SAME

TECHNICAL FIELD

The present invention relates to a non-oriented electrical steel sheet and a method for manufacturing the same.

Priority is claimed on Japanese Patent Application No. 2021-063642, filed Apr. 2, 2021, the content of which is incorporated herein by reference.

BACKGROUND ART

In recent years, global environmental problems have been focused upon, and demands for measures to save energy have increased. Among the demands for measures to save energy, there is a strong demand for higher efficiency in electrical machines. Therefore, even in non-oriented electrical steel sheets, which are widely used as iron core materials for motors, generators and the like, there is a growing demand for improved magnetic characteristics. This tendency is significant in driving motors for electric automobiles and hybrid automobiles and motors for air conditioner compressors.

Motor cores of various motors as described above are composed of a stator as a stationary part and a rotor as a rotating part. Properties required for the stator and the rotor constituting the motor core are different from each other. The stator is required to have excellent magnetic characteristics (low iron loss and high magnetic flux density), and particularly, low iron loss. On the other hand, the rotor is required to have excellent mechanical properties (high strength), and, though not as much as the stator, low iron loss.

Since properties required for the stator and the rotor are different from each other, desired properties can be realized by separately producing a non-oriented electrical steel sheet for the stator and a non-oriented electrical steel sheet for the rotor. However, preparing of two types of non-oriented electrical steel sheets causes a decrease in yield. Therefore, in order to achieve the high strength required for the rotor and achieve the low iron loss required for the stator, non-oriented electrical steel sheets having excellent strength and excellent magnetic characteristics have been studied so far.

For example, in Patent Documents 1 to 3, attempts have been made to achieve both high strength and excellent magnetic characteristics.

CITATION LIST

Patent Document

[Patent Document 1]
PCT International Publication No. WO2019/017426
[Patent Document 2]
PCT International Publication No. WO2020/091039
[Patent Document 3]
PCT International Publication No. WO2020/153387
[Patent Document 4]
Japanese Unexamined Patent Application, First Publication No. 2013-91837
[Patent Document 5]
Japanese Unexamined Patent Application, First Publication No. 2002-146491

SUMMARY OF THE INVENTION

Problems to be Solved by the Invention

However, in order to realize a non-oriented electrical steel sheet in which both high strength and low iron loss are achieved, as disclosed in Patent Documents 1 to 3, since it is necessary to incorporate a large amount of alloy elements, there are problems such as the toughness decreasing and breakage during cold rolling being likely to occur.

The present invention has been made in order to address such problems, and an object of the present invention is to stably provide a non-oriented electrical steel sheet having high strength and excellent magnetic characteristics.

Means for Solving the Problem

The gist of the present invention is the following non-oriented electrical steel sheet and method for manufacturing the same.

(1) A non-oriented electrical steel sheet according to one embodiment of the present invention, including a base material having a chemical composition including, in mass %, C: 0 to 0.0050%,
Si: 3.7 to 4.8%,
Mn: 0.05% or more and less than 0.50%,
sol. Al: 0.05 to 0.45%,
P: 0 to 0.030%,
S: 0 to 0.0030%,
N: 0 to 0.0040%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500,
Sn: 0 to 0.100%,
Sb: 0 to 0.100%, and
the remainder: Fe and impurities,
wherein a recrystallization rate is less than 100% in terms of an area fraction,
the following Formula (i) and Formula (ii) are satisfied, and
the tensile strength is more than 700 MPa:

$$4.3 \leq Si + sol.\ Al + 0.5 \times Mn \leq 4.9 \quad (i)$$

where, element symbols in the formula indicate the amount (mass %) of the elements:

$$(B_{50}(0°) + 2 \times B_{50}(45°) + B_{50}(90°))/4 \geq 1.57 \quad (ii)$$

where, in Formula (ii), $B_{50}(0°)$ is a magnetic flux density (T) at a magnetizing force of 5,000 A/m in the rolling direction, $B_{50}(45°)$ is a magnetic flux density (T) at a magnetizing force of 5,000 A/m in the direction 45° from the rolling direction, and $B_{50}(90°)$ is a magnetic flux density (T) at a magnetizing force of 5,000 A/m in the direction 90° from the rolling direction.

(2) The non-oriented electrical steel sheet according to (1), wherein the chemical composition contains, in mass %, one or two selected from the group consisting of
Sn: 0.005 to 0.100%, and
Sb: 0.005 to 0.100%.

(3) The non-oriented electrical steel sheet according to (1) or (2), wherein the base material has an insulation coating on its surface.

(4) A method for manufacturing a non-oriented electrical steel sheet according to another embodiment of the present invention is a method for manufacturing the non-oriented electrical steel sheet according to any one of (1) to (3), including performing, on a steel ingot having a chemical composition satisfying the following Formula (i), which includes, in mass %,
C: 0 to 0.0050%,
Si: 3.7 to 4.8%,
Mn: 0.05% or more and less than 0.50%,
sol. Al: 0.05 to 0.45%,
P: 0 to 0.030%,
S: 0 to 0.0030%,
N: 0 to 0.0040%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500,
Sn: 0 to 0.100%,
Sb: 0 to 0.100%, and
the remainder: Fe and impurities,
a hot rolling process;
a primary cold rolling process in which a sheet thickness is reduced to 1.0 mm or less;
an intermediate annealing process;
a secondary cold rolling process; and
a final annealing process with a soaking temperature of 700 to 800° C. and a soaking time of 1 to 300 sec, in that order:

$$4.3 \leq Si + sol.\ Al + 0.5 \times Mn \leq 4.9 \quad (i)$$

where, element symbols in the formula indicate the amount (mass %) of the elements.

Effects of the Invention

According to the above embodiment of the present invention, it is possible to stably obtain a non-oriented electrical steel sheet having high strength and excellent magnetic characteristics.

EMBODIMENT(S) FOR IMPLEMENTING THE INVENTION

Figure 1A:
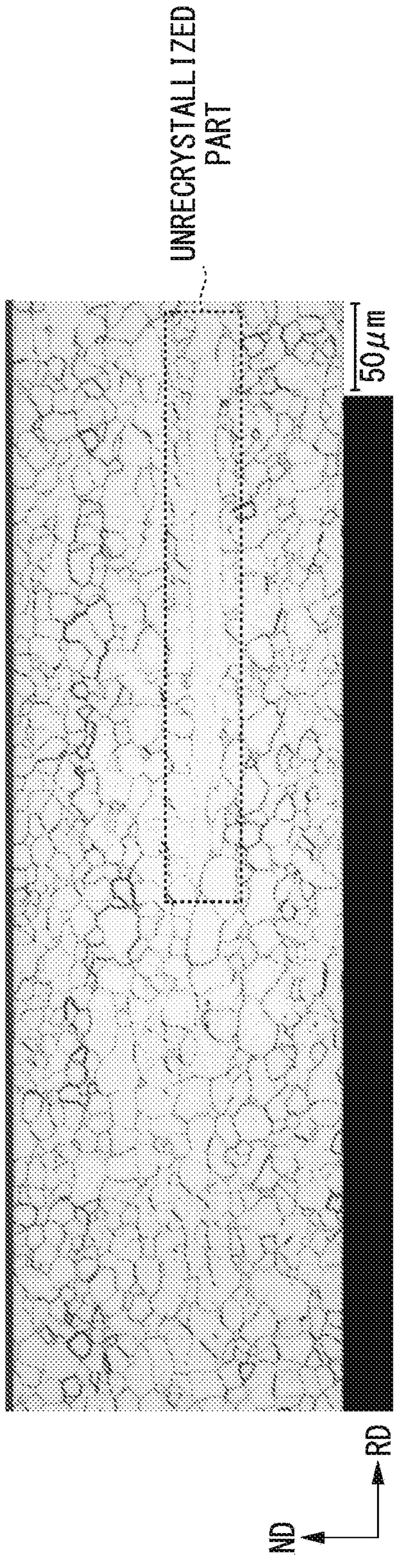
FIG. 1A is a cross-sectional view of a non-oriented electrical steel sheet for illustrating a method for calculating a recrystallization rate.

In order to address the above problems, the inventors conducted extensive studies, and obtained the following findings as a result.

Si, Mn and sol. Al are elements that have an effect of increasing the electrical resistance of the steel and reducing Eddy current loss. In addition, these elements are elements that also contribute to increasing the strength of the steel.

Among Si, Mn and sol. Al, and Si are elements that contribute to increasing the electrical resistance and strength most efficiently. sol. Al has an effect of increasing the electrical resistance and strength, second only to Si. On the other hand, Mn has a slightly weaker effect of increasing the electrical resistance and strength than that of Si and sol. Al.

Accordingly, in the present embodiment, when the amounts of Si, sol. Al and Mn are adjusted to be within appropriate ranges, improvement in increasing strength and magnetic characteristics is achieved.

Next, improvement in the toughness during cold rolling of a steel sheet containing large amounts of the above Si, sol. Al and Mn is studied.

Conventionally, if steel contains large amounts of alloy elements such as Si, sol. Al and Mn in order to increase the strength of the steel, the toughness decreases, and as a result, there is a problem of breakage being likely to occur during cold rolling. Therefore, the inventors conducted extensive studies regarding improvement in the toughness during cold rolling of a steel sheet (high alloy steel) containing a large amount of alloy elements, and as a result, found that, when hot-band annealing is omitted, it is possible to minimize breakage during cold rolling even for high alloy steel. Specifically, they found that, when a hot-rolled sheet that is not annealed is pickled, primary cold rolling is then performed until the sheet thickness reaches 1 mm or less, intermediate annealing is then performed, and secondary cold rolling is additionally performed, it is possible to secure the toughness during double cold rolling even for high alloy steel.

Double cold rolling method has been studied previously. For example, in Patent Documents 4 and 5, attempts have been made to achieve excellent magnetic characteristics and high strength.

However, in the method disclosed in Patent Document 4, since the crystal particle size is coarse, the high strength required by the present embodiment cannot be obtained. In addition, the method disclosed in Patent Document 5 is not satisfactory in terms of high strength because the amounts of Si, Mn and Al are low.

Therefore, the inventors further conducted extensive studies, and as a result, found that, in order to realize a non-oriented electrical steel sheet having excellent toughness during cold rolling and high strength and favorable magnetic characteristics, it is important to adjust the amounts of Si, sol. Al and Mn to be within appropriate ranges, appropriately control the sheet thickness when secondary cold rolling starts, and also appropriately control the metal structure after final annealing.

The present invention has been made based on the above findings. Preferable embodiments of the present invention will be described below in detail. However, the present invention is not limited to only the configuration disclosed in the present embodiment, and can be variously modified without departing from the spirit and scope of the present invention.

1. Overall Configuration

A non-oriented electrical steel sheet according to the present embodiment has high strength and excellent magnetic characteristics, and is thus suitable for stators and rotors. In manufacturing of the non-oriented electrical steel sheet according to the present embodiment, the toughness during cold rolling is excellent, and breakage during rolling can be minimized, and thus stable manufacturing is possible. In addition, the non-oriented electrical steel sheet according to the present embodiment preferably has an insulation coating on the surface of a base material (silicon steel sheet) to be described below.

2. Chemical Composition of Base Material

In the chemical composition of the base material of the non-oriented electrical steel sheet according to the present embodiment, the reason for limiting each element is as follows. Here, in the following description, "%" of the amount means "mass %." A limited numerical value range indicated by "to" includes the lower limit value and the upper limit value.

C: 0 to 0.0050%

C (carbon) is an element that causes iron loss deterioration of a non-oriented electrical steel sheet. If the C content is more than 0.0050%, the iron loss of the non-oriented electrical steel sheet deteriorates, and favorable magnetic characteristics cannot be obtained. Therefore, the C content is 0.0050% or less. The C content is preferably 0.0040% or less, more preferably 0.0035% or less, and still more preferably 0.0030% or less. The C content may be 0%. However, since it is difficult to make the C content 0% in a practical steel sheet in terms of manufacturing, the C content may be more than 0%. Here, since C contributes to increasing the strength of the non-oriented electrical steel sheet, the C content is preferably 0.0005% or more and more preferably 0.0010% or more in order to obtain the effect.

Si: 3.7 to 4.8%

Si (silicon) is an element that increases the electrical resistance of the steel, reduces Eddy current loss, and improve high-frequency iron loss of the non-oriented electrical steel sheet. In addition, since Si has a strong solid-solution strengthening ability, it is an element effective for increasing the strength of the non-oriented electrical steel sheet. In order to obtain these effects, the Si content is 3.7% or more. The Si content is preferably 3.8% or more, more preferably 3.9% or more, and still more preferably 4.0% or more. On the other hand, if the Si content is excessive, the processability significantly deteriorates, and it is difficult to perform cold rolling. Therefore, the Si content is 4.8% or less. The Si content is preferably 4.7% or less and more preferably 4.6% or less.

Mn: 0.05% or More and Less than 0.50%

Mn (manganese) is an element effective for increasing the electrical resistance of the steel, reducing Eddy current loss, and improving high-frequency iron loss of the non-oriented electrical steel sheet. In addition, if the Mn content is too low, an effect of increasing electrical resistance is weak, fine sulfides (MnS) are precipitated in steel, and the iron loss deteriorates. Therefore, the Mn content is 0.05% or more. The Mn content is preferably 0.10% or more and more preferably 0.15% or more. On the other hand, if the Mn content is excessive, the decrease in the magnetic flux density of the non-oriented electrical steel sheet becomes significant. Therefore, the Mn content is less than 0.50%. The Mn content is preferably 0.40% or less and more preferably 0.30% or less.

Sol. Al: 0.05 to 0.45% sol. Al (aluminum) is an element that has an effect of increasing the electrical resistance of the steel, reducing Eddy current loss, and improving high-frequency iron loss of the non-oriented electrical steel sheet. In addition, sol. Al is an element that contributes to increasing the strength of the non-oriented electrical steel sheet by solid-solution strengthening, although not as much as Si. In order to obtain these effects, the sol. Al content is 0.05% or more. The sol. Al content is preferably 0.10% or more and more preferably 0.15% or more. On the other hand, if the sol. Al content is excessive, the toughness deteriorates and a risk of breakage during cold rolling increases. Therefore, the sol. Al content is 0.45% or less. The sol. Al content is preferably 0.40% or less and more preferably 0.35% or less.

Here, in the present embodiment, sol. Al means acid-soluble Al, and indicates solid solution Al present in steel in a solid-solution state.

In the present embodiment, when the amounts of Si, sol. Al and Mn are appropriately controlled, the electrical resistance in steel is secured. In addition, in order to secure the strength, it is necessary to appropriately control the amounts of Si, sol. Al and Mn. On the other hand, in order to secure the magnetic flux density and the toughness, the upper limit of the total amount of Si, sol. Al and Mn is also required. Therefore, in addition to the amounts of Si, sol. Al and Mn being within the above ranges, it is necessary to satisfy the following Formula (i). In order to secure the electrical resistance and strength of the steel, the value on the middle side of the following Formula (i) is preferably 4.4 or more and more preferably 4.5 or more. On the other hand, in order to secure the magnetic flux density and toughness of the steel, the value on the middle side of the following Formula (i) is preferably 4.8 or less and more preferably 4.7 or less.

$$4.3 \leq Si + sol.\ Al + 0.5 \times Mn \leq 4.9 \qquad (i)$$

Here, element symbols in the above formula are the amount (mass %) of the elements.

P: 0 to 0.030%

P (phosphorus) is contained in steel as an impurity, and if the amount is excessive, the toughness of the non-oriented electrical steel sheet is significantly lowered. Therefore, the P content is 0.030% or less. The P content is preferably 0.025% or less and more preferably 0.020% or less. The P content may be 0%. Here, since extreme reduction in the P content may cause an increase in manufacturing costs, the P content is preferably 0.003% or more and more preferably 0.005% or more.

S: 0 to 0.0030%

S (sulfur) is an element that increases iron loss by forming fine MnS precipitate and deteriorates magnetic characteristics of the non-oriented electrical steel sheet. Therefore, the S content is 0.0030% or less. The S content is preferably 0.0020% or less, more preferably 0.0018% or less, and still more preferably 0.0015% or less. The S content may be 0%. Here, since extreme reduction in the S content may cause an increase in manufacturing costs, the S content is preferably 0.0001% or more, more preferably 0.0003% or more, and still more preferably 0.0005% or more.

N: 0 to 0.0040%

N (nitrogen) is an element that is inevitably mixed in steel, and is an element that forms nitrides, increases iron loss, and deteriorates magnetic characteristics of the non-oriented electrical steel sheet. Therefore, the N content is 0.0040% or less. The N content is preferably 0.0030% or less and more preferably 0.0020% or less. The N content may be 0%. Here, since extreme reduction in the N content may cause an increase in manufacturing costs, the N content is preferably 0.0005% or more.

Ti: 0% or More and Less than 0.0050%

Ti (titanium) is an element that is inevitably mixed in steel and can combine with carbon or nitrogen to form precipitates (carbides, nitrides). When carbides or nitrides are formed, these precipitates themselves deteriorate magnetic characteristics of the non-oriented electrical steel sheet. In addition, carbides or nitrides inhibit crystal grain growth during final annealing and deteriorate magnetic characteristics of the non-oriented electrical steel sheet. Therefore, the Ti content is less than 0.0050%. The Ti content is preferably 0.0040% or less, more preferably 0.0030% or less, and still more preferably 0.0020% or less. The Ti content may be 0%. Here, since extreme reduction in the Ti content may cause an increase in manufacturing costs, the Ti content is preferably 0.0005% or more.

Nb: 0% or More and Less than 0.0050%

Nb (niobium) is an element that combines with carbon or nitrogen to form precipitates (carbides and nitrides), and contributes to increasing the strength, and these precipitates themselves deteriorate magnetic characteristics of the non-oriented electrical steel sheet. Therefore, the Nb content is set to less than 0.0050%. The Nb content is preferably 0.0040% or less, more preferably 0.0030% or less, and still more preferably 0.0020% or less. In addition, the Nb content is more preferably equal to or less than the measurement limit, and specifically, more preferably less than 0.0001%. Since a lower Nb content is better, the Nb content may be 0%.

Zr: 0% or More and Less than 0.0050%

Zr (zirconium) is an element that combines with carbon or nitrogen to form precipitates (carbides and nitrides), and contributes to increasing the strength, and these precipitates themselves deteriorate magnetic characteristics of the non-oriented electrical steel sheet. Therefore, the Zr content is set to less than 0.0050%. The Zr content is preferably 0.0040% or less, more preferably 0.0030% or less, and still more preferably 0.0020% or less. In addition, the Zr content is more preferably equal to or less than the measurement limit, and specifically, more preferably 0.0001% or less. Since a lower Zr content is better, the Zr content may be 0%.

V: 0% or More and Less than 0.0050%

V (vanadium) is an element that combines with carbon or nitrogen to form precipitates (carbides and nitrides), and contributes to increasing the strength, but these precipitates themselves deteriorate magnetic characteristics of the non-oriented electrical steel sheet. Therefore, the V content is less than 0.0050%. The V content is preferably 0.0040% or less, more preferably 0.0030% or less, and still more preferably 0.0020% or less. The V content is more preferably equal to or less than the measurement limit, and specifically, still more preferably 0.0001% or less. Since a lower V content is better, the V content may be 0%.

Cu: 0% or More and Less than 0.200%

Cu (copper) is an element that is inevitably mixed in steel. If Cu is intentionally contained, manufacturing costs of the non-oriented electrical steel sheet increase. Therefore, in the present embodiment, Cu does not need to be actively contained and may be contained at an impurity level. The Cu content is less than 0.200%, which is a value of the maximum amount that can be inevitably mixed in the manufacturing process. The Cu content is preferably 0.150% or less and more preferably 0.100% or less. The Cu content may be 0%. Here, the lower limit value of the Cu content is not particularly limited, and extreme reduction in the Cu content may cause an increase in manufacturing costs. Therefore, the Cu content is preferably 0.001% or more, more preferably 0.003% or more, and still more preferably 0.005% or more.

Ni: 0% or More and Less than 0.500%

Ni (nickel) is an element that is inevitably mixed in steel. However, since Ni is an element that improves the strength of the non-oriented electrical steel sheet, it may be contained intentionally. However, since Ni is expensive, the Ni content is less than 0.500%. The Ni content is preferably 0.400% or less and more preferably 0.300% or less. The Ni content may be 0%. Here, the lower limit value of the Ni content is not particularly limited, but extreme reduction in the Ni content may cause an increase in manufacturing costs. Therefore, the Ni content is preferably 0.001% or more, more preferably 0.003% or more, and still more preferably 0.005% or more.

Sn: 0 to 0.100%

Sb: 0 to 0.100%

Sn (tin) and Sb (antimony) are beneficial elements that segregate on the surface of a base material, minimize oxidation and nitriding during annealing, and thus contribute to securing low iron loss in the non-oriented electrical steel sheet. In addition, Sn and Sb also have an effect of improving the texture by segregating at crystal grain boundaries and increasing the magnetic flux density of the non-oriented electrical steel sheet. Therefore, as necessary, at least one of Sn and Sb may be contained. However, if the amount of these elements is excessive, the toughness of the steel may decrease and cold rolling may become difficult. Therefore, the amount of each of Sn and Sb is 0.100% or less. The amount of each of Sn and Sb is preferably 0.060% or less. The amount of each of Sn and Sb may be 0%. Here, in order to reliably obtain the above effect, the amount of at least one of Sn and Sb is preferably 0.005% or more and more preferably 0.010% or more.

In the chemical composition of the base material (silicon steel sheet) of the non-oriented electrical steel sheet according to the present embodiment, the remainder is made up of Fe and impurities. Here, "impurities" are components that are mixed in from raw materials such as ores and scraps and due to various factors in the manufacturing process when steel is industrially manufactured, and are components that are allowable as long as they do not adversely affect properties of the non-oriented electrical steel sheet according to the present embodiment.

Here, regarding impurity elements, the amounts of Cr and Mo are not particularly specified in the present embodiment. In the non-oriented electrical steel sheet according to the present embodiment, even if each of these elements is contained in a range of 0.5% or less, it does not particularly affect properties of the non-oriented electrical steel sheet according to the present embodiment. In addition, even if each of Ca and Mg is contained in a range of 0.002% or less, it does not particularly affect properties of the non-oriented electrical steel sheet according to the present embodiment. Even if rare earth elements (REM) are contained in a range of 0.004% or less, it does not particularly affect properties of the non-oriented electrical steel sheet according to the present embodiment. Here, in the present embodiment, REM refers to a total of 17 elements composed of Sc, Y and lanthanoids, and the REM content refers to the total amount of these elements.

O is also an impurity element, but even if it is contained in a range of 0.05% or less, it does not affect properties of the non-oriented electrical steel sheet according to the present embodiment. Since O may be mixed into steel in the annealing process, even if the amount in a slab stage (that is, ladel value) is in a range of 0.01% or less, it does not particularly affect properties of the non-oriented electrical steel sheet according to the present embodiment.

In addition, in addition to the above elements, elements such as Pb, Bi, As, B, and Se may be included as impurity elements, and if each amount thereof is in a range of 0.0050% or less, properties of the non-oriented electrical steel sheet according to the present embodiment are not impaired.

The chemical composition of the base material of the non-oriented electrical steel sheet according to the present embodiment may be measured using ICP emission spectrometry or spark discharge optical emission spectrometry. In addition, C and S may be measured using a combustion-infrared absorption method, N may be measured using an inert gas combustion-thermal conductivity method, and O may be measured using an inert gas fusion-non-dispersive infrared absorption method. Here, if the steel sheet to be measured has an insulation coating or the like, the chemical composition is measured after the coating or the like is removed.

3. Recrystallization Rate

In the non-oriented electrical steel sheet according to the present embodiment, in order to secure the strength, the recrystallization rate of the base material is set to less than 100% by adjusting final annealing conditions. If recrystallization is completed, the dislocation density is too low and desired strength cannot be obtained. The recrystallization rate is preferably 99% or less. The lower limit of the recrystallization rate is not particularly limited, and is preferably 20% or more because the iron loss increases if the lower limit is too low. The recrystallization rate can be evaluated by polishing and etching a cross section of a steel sheet parallel to the rolling direction, exposing a microstructure, and measuring an area fraction of recrystallized grains and an area fraction of non-recrystallized regions.

Hereinafter, a method for measuring a recrystallization rate will be described in detail.

Figure 1B:
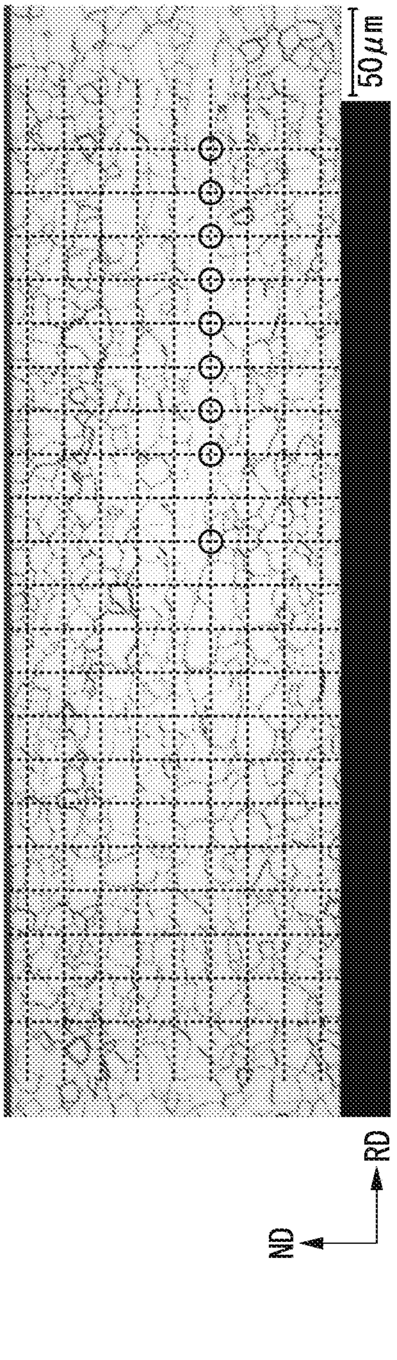
FIG. 1B is a cross-sectional view of a non-oriented electrical steel sheet for illustrating a method for calculating a recrystallization rate.

FIG. 1A and FIG. 1B show cross sections of the non-oriented electrical steel sheet according to the present embodiment parallel to the rolling direction and the sheet thickness direction. In FIG. 1A, "RD" indicates the rolling direction, and "ND" indicates the sheet thickness direction (that is, the direction perpendicular to the sheet surface).

First, a test piece is cut out from a non-oriented electrical steel sheet so that the structure observation surface is a cross section parallel to the rolling direction and the sheet thickness direction, and the cut test piece is embedded in a resin. Next, the structure observation surface is polished with abrasive paper and subjected buff polishing in order, in order to mirror finish the observation surface. In addition, as shown in FIG. 1A, crystal grain boundaries are caused to appear with a corrosive liquid (nital: 5% nitric acid ethanol solution), the structure observation surface is observed under an optical microscope, and the recrystallization rate is measured by the following method.

An unetched portion extending in the rolling direction (RD) shown in FIG. 1A is determined as an unrecrystallized part, and the recrystallization rate is defined by an area fraction of the portion excluding the unrecrystallized part. Specifically, as shown in FIG. 1B, in a mesh provided with a pitch of 20 μm in the sheet thickness direction (ND) and a pitch of 25 μm in the rolling direction (RD), excluding the unrecrystallized part, a ratio of the number of intersections to the total number of mesh intersections is defined as a recrystallization rate (refer to the following formula). However, since there are some variations in the structure within the same sample, the recrystallization rate is measured at 5 points on the observation surface, and the average value thereof is used as the recrystallization rate of the test piece. Here, in FIG. 1B, the mark "O" indicates the mesh intersection of the unrecrystallized part (in the case of FIG. 1B, the number of mesh intersections in the unrecrystallized part is "9" and the recrystallization rate is "95%").

recrystallization rate (%)=100−100 (number of mesh intersections in the unrecrystallized part/total number of mesh intersections)

Here, "recrystallization" can be defined as follows.

Lattice defects such as dislocation are introduced into the steel sheet during cold rolling, and internal energy derived therefrom is accumulated in the steel sheet. Then, when the cold-rolled steel sheet is maintained at a high temperature, atom diffusion occurs and lattice defects move. The internal energy tends to decrease due to coalescence and annihilation of dislocations with positive and negative signs and movement of stable configuration (rearrangement of dislocations). This phenomenon is called "recovery." In this case, no change in the metal structure is observed at an optical microscope level. The unrecrystallized part (region surrounded by a dotted line) in FIG. 1A is the recovered structure. In addition, if the high temperature is maintained, crystal grains (recrystallized grains) with a very low dislocation density are newly generated and grown, and thus the internal energy accumulated in the material is released. This phenomenon is called "recrystallization," and the region excluding the unrecrystallized part in FIG. 1A is the recrystallized structure.

4. Magnetic Characteristics

In the non-oriented electrical steel sheet according to the present embodiment, excellent magnetic characteristics means that the average iron loss $W_{10/400}$ of the entire circumference is low and the average magnetic flux density $B_{50}$ of the entire circumference is high. Here, the iron loss $W_{10/400}$ means iron loss generated under conditions in which the maximum magnetic flux density is 1.0 T and the frequency is 400 Hz. The magnetic flux density $B_{50}$ means the magnetic flux density in a magnetic field of 5,000 A/m.

The average property of the entire circumference means the average value of the property in the rolling direction, the property in the direction 45° from the rolling direction and the property in the direction 90° from the rolling direction, and is as follows. Here, the direction 90° from the rolling direction means the direction perpendicular to the rolling direction within the sheet surface (that is, the direction perpendicular to the rolling direction and the sheet thickness direction).

$$\text{average } W_{10/400} \text{ of the entire circumference}=(W_{10/400}(0°)+2\times W_{10/400}(45°)+W_{10/400}(90°))/4$$

$$\text{average } B_{50} \text{ of the entire circumference}=(B_{50}(0°)+2\times B_{50}(45°)+B_{50}(90°))/4$$

Specifically, excellent iron loss means that, when the sheet thickness of the non-oriented electrical steel sheet is more than 0.30 mm and 0.35 mm or less, the average $W_{10/400}$ of the entire circumference is 40.0 W/kg or less, when the sheet thickness is more than 0.25 mm and 0.30 mm or less, the average $W_{10/400}$ of the entire circumference is 35.0 W/kg or less, when the sheet thickness is more than 0.20 mm and 0.25 mm or less, the average $W_{10/400}$ of the entire circumference is 30.0 W/kg or less, when the sheet thickness is 0.20 mm or less, the average $W_{10/400}$ of the entire circumference is 25.0 W/kg or less, and the average $B_{50}$ of the entire circumference is 1.57 T or more regardless of the sheet thickness. Here, in the present embodiment, the above magnetic characteristics (the iron loss $W_{10/400}$ and the magnetic flux density $B_{50}$) are measured by the Epstein test as specified in JIS C 2550-1 (2011) using a magnetic measurement test piece in the directions.

Here, when it is difficult to perform measurement by the Epstein method, for example, when the magnetic measurement test piece is small, measurement may be performed after correcting the instrument difference by a single sheet magnetic characteristic measurement method (Single Sheet Tester: SST) as specified in JIS C 2556 (2015) so that the measured values are the same as those of the Epstein method.

5. Mechanical Property

In the non-oriented electrical steel sheet according to the present embodiment, having high strength means that the tensile (maximum) strength in the rolling direction is more than 700 MPa. In the non-oriented electrical steel sheet according to the present embodiment, the tensile strength is more than 700 MPa. The tensile strength is preferably 710 MPa or more. Here, the tensile strength is measured by performing a tensile test according to JIS Z 2241 (2011).

According to the non-oriented electrical steel sheet of the present embodiment, it is possible to achieve both high strength and excellent magnetic characteristics. This could not be achieved by simple high alloying as in the related art. In the present embodiment, in addition to optimizing the total amount of alloy elements that contribute to the strength (Formula (i)), conditions for a manufacturing method to be described below (particularly, the secondary cold rolling process and the final annealing process) are controlled, and thus a non-oriented electrical steel sheet having both high strength and excellent magnetic characteristics can be achieved.

Therefore, according to the non-oriented electrical steel sheet of the present embodiment, it can be suitably used as an iron core material for rotary machines such as driving motors and generators such as electric automobiles and hybrid automobiles, and compressor motors for air conditioners and large air conditioners.

6. Insulation Coating

In the non-oriented electrical steel sheet according to the present embodiment, the base material preferably has an insulation coating on the surface. Since the non-oriented electrical steel sheet is used after lamination after a core blank is punched out, when an insulation coating is provided on the surface of the base material, it is possible to reduce an Eddy current between sheets, and it is possible to reduce Eddy current loss of the core.

In the present embodiment, the type of the insulation coating is not particularly limited, and a known insulation coating used as the insulation coating of the non-oriented electrical steel sheet can be used. As such an insulation coating, for example, a composite insulation coating mainly composed of an inorganic substance and additionally containing an organic substance is an exemplary example.

Here, the composite insulation coating is, for example, an insulation coating mainly composed of at least one of metal salts such as metal chromate and metal phosphate or inorganic substances such as colloidal silica, Zr compounds, and Ti compounds and in which fine organic resin particles are dispersed. Particularly, in order to reduce the environmental load during production, which has been in high demand in recent years, an insulation coating using metal phosphate and a Zr or Ti coupling agent as a starting material or an insulation coating using metal phosphate, and a carbonate or ammonium salt of a Zr or Ti coupling agent as a starting material is preferably used.

The adhesion amount of the insulation coating is not particularly limited, and for example, it is preferably about 200 to 1,500 $mg/m^2$ per surface and more preferably 300 to 1,200 $mg/m^2$ per surface. When an insulation coating is formed so that the adhesion amount is within the above range, it is possible to maintain excellent uniformity. Here, when the adhesion amount of the insulation coating is measured afterwards, it is possible to use known various measurement methods, and for example, a method for measuring a mass difference before and after immersion in a sodium hydroxide solution or a fluorescent X-ray method using a calibration curve method may be appropriately used.

While the non-oriented electrical steel sheet according to the present embodiment has been described above, the average crystalline grain size of the non-oriented electrical steel sheet of the present embodiment is not particularly limited. However, the average crystalline grain size of the recrystallized part is about 10 μm to 30 μm.

In addition, the sheet thickness of the non-oriented electrical steel sheet according to the present embodiment is not particularly limited. Generally, if the sheet thickness is thinner, the iron loss is lower, but manufacturing costs increase. Based on this point, if the sheet thickness is 0.10 mm or more, the iron loss is lower, and an increase in cost is minimized. In addition, if the sheet thickness is 0.35 mm or less, it is possible to maintain low iron loss. Therefore, the sheet thickness of the non-oriented electrical steel sheet according to the present embodiment is preferably 0.10 to 0.35 mm and more preferably 0.15 to 0.30 mm.

7. Manufacturing Method

A method for manufacturing a non-oriented electrical steel sheet according to the present embodiment is not particularly limited, and manufacturing can be performed when a steel ingot having the above chemical composition is subjected to, for example, a hot rolling process, a pickling process, a primary cold rolling process, an intermediate annealing process, a secondary cold rolling process and a final annealing process in that order under the conditions shown below. In addition, when an insulation coating is formed on the surface of the base material (silicon steel sheet), an insulation coating forming process is performed after the final annealing process. Hereinafter, respective processes will be described in detail.

<Hot Rolling Process>

A steel ingot (slab) having the above chemical composition is heated, the heated steel ingot is hot-rolled to obtain a hot-rolled steel sheet. Here, the heating temperature of the steel ingot when subjected to hot rolling is not particularly specified, and is preferably, for example, 1,050 to 1,250° C. In addition, the sheet thickness of the hot-rolled steel sheet after hot rolling is not particularly specified, but in consideration of the efficiency of hot rolling and subsequent processes, for example, about 1.5 to 3.0 mm is preferable.

<Pickling Process>

After the hot rolling process, pickling is performed without performing hot-band annealing. Generally, after the hot rolling process, after hot-band annealing is performed, pickling is performed in many cases. However, in the case of the steel containing a large amount of alloy elements as in the present embodiment, when hot-band annealing is performed, the toughness deteriorates, and breakage or the like may occur during cold rolling. Therefore, in the present embodiment, hot-band annealing is omitted. Specifically, in the hot-rolled sheet, pickling is performed without annealing, and a scale layer formed on the surface of the base material is removed. Here, pickling conditions such as the concentration of an acid used for pickling, the concentration of an accelerator used for pickling, and the temperature of a pickling solution are not particularly limited, and known pickling conditions can be used.

<Primary Cold Rolling Process>

After pickling, the sheet thickness is reduced to 1.0 mm or less. If the sheet thickness after reduction is more than 1.0 mm, there is a high risk of breakage during secondary cold rolling. The sheet thickness after reduction is preferably 0.9 mm or less and more preferably 0.8 mm or less.

<Intermediate Annealing Process>

After primary cold rolling, intermediate annealing is performed in order to improve magnetic characteristics of the non-oriented electrical steel sheet. Heat treatment conditions in the intermediate annealing are not particularly specified, and for example, it is preferable to anneal a primary cold-rolled sheet at 800 to 1,050° C. for 1 to 300 s. If the soaking temperature in the intermediate annealing is too low, there is a risk of the average magnetic flux density $B_{50}$ of the entire circumference decreasing. Therefore, the soaking temperature in the intermediate annealing is preferably 800° C. or higher, more preferably 850° C. or higher, and still more preferably 900° C. or higher. On the other hand, if the soaking temperature in the intermediate annealing is too high, there is a risk of breakage during secondary cold rolling. Therefore, the soaking temperature in the intermediate annealing is preferably 1,050° C. or lower, more preferably 1,040° C. or lower, and still more preferably 1,030° C. or lower. In addition, if the soaking time in the intermediate annealing is too short, there is a risk of the average magnetic flux density $B_{50}$ of the entire circumference decreasing. Therefore, the soaking time in the intermediate annealing is preferably 1 sec or higher, more preferably 5 sec or higher, and still more preferably 10 sec or higher. On the other hand, if the soaking time in the intermediate annealing is too long, there is a risk of manufacturing costs increasing. Therefore, the soaking time in the intermediate annealing is preferably 300 sec or shorter, more preferably 200 sec or shorter, and still more preferably 100 sec. Here, it is preferable to perform a degreasing treatment because a rolling oil during primary cold rolling adheres before the intermediate annealing.

<Secondary Cold Rolling Process>

After the intermediate annealing, secondary cold rolling is performed. In order to reduce the iron loss, in the secondary cold rolling, the final sheet thickness of the base material is preferably 0.35 mm or less. In addition, the final sheet thickness is preferably 0.10 mm or more in consideration of manufacturing costs for secondary cold rolling and final annealing. Here, when the intermediate annealing is performed under an oxidizing atmosphere, it is preferable to perform secondary cold rolling after the scale is removed. In addition, the rolling reduction rate in the secondary cold rolling is not particularly limited, and may be, for example, 50% or more and less than 85%.

<Final Annealing Process>

After the secondary cold rolling, final annealing is performed. In a method for manufacturing a non-oriented electrical steel sheet according to the present embodiment, a continuous annealing furnace is used in the final annealing.

Here, regarding final annealing conditions, the soaking temperature is 700 to 800° C., and the soaking time is 1 to 300 sec. Here, a $H_2$ atmosphere with a proportion of $H_2$ to 0 to 100 volume %, or $N_2$ atmosphere or a mixed atmosphere thereof (that is, $H_2$+$N_2$=100 volume %) is used, and the dew point of the atmosphere is preferably 30° C. or lower.

If the soaking temperature is lower than 700° C., the density of dislocations introduced during secondary cold rolling is too high, and the iron loss and the magnetic flux density of the non-oriented electrical steel sheet deteriorate. On the other hand, if the soaking temperature is higher than 800° C., recrystallization progresses and the strength of the non-oriented electrical steel sheet becomes insufficient. The lower limit of the soaking temperature is preferably 710° C. or higher, and more preferably 720° C. or higher. The upper limit of the soaking temperature is preferably 800° C. or lower, and more preferably 790° C. or lower. In addition, if the soaking time is shorter than 1 sec, it is not possible to sufficiently reduce the dislocation density. On the other hand, if the soaking time is longer than 300 sec, an increase in manufacturing costs is caused. Therefore, the lower limit of the soaking time is preferably 5 sec or higher, and more preferably 10 sec or higher. The upper limit of the soaking time is preferably 200 sec or shorter, and more preferably 100 sec or shorter. The proportion of $H_2$ in the atmosphere is more preferably 0 to 90 volume %. A lower dew point of the atmosphere is preferable in order to increase the magnetic flux density. The dew point of the atmosphere is more preferably 10° C. or lower, still more preferably 0° C. or lower, and yet more preferably −10° C. or lower.

<Insulation Coating Forming Process>

After the final annealing, as necessary, an insulation coating forming process is performed. Here, a method for forming an insulation coating is not particularly limited, and a treatment solution may be applied and dried by a known method using a treatment solution for forming a known insulation coating as shown below. As a known insulation coating, for example, a composite insulation coating mainly composed of an inorganic substance and additionally containing an organic substance is an exemplary example.

The composite insulation coating is, for example, an insulation coating mainly composed of at least one of metal salts such as metal chromate and metal phosphate or inorganic substances such as colloidal silica, Zr compounds, and Ti compounds and in which fine organic resin particles are dispersed. Particularly, in order to reduce the environmental load during production, which has been in high demand in recent years, an insulation coating using metal phosphate and a Zr or Ti coupling agent as a starting material or an insulation coating using metal phosphate, and a carbonate or ammonium salt of a Zr or Ti coupling agent as a starting material is preferably used.

Before a treatment solution is applied, the surface of the base material on which an insulation coating is formed may be subjected to an arbitrary pretreatment such as a degreasing treatment using an alkali and a pickling treatment using hydrochloric acid, sulfuric acid, or phosphoric acid. Without performing these pretreatments, a treatment solution may be directly applied to the surface of the base material after final annealing.

Since the non-oriented electrical steel sheet of the present embodiment obtained as described above has excellent properties such as low iron loss and high strength, it is suitably used as a material for a rotor core. However, when the non-oriented electrical steel sheet is used for a stator core, there is a risk of excellent motor efficiency not being obtained due to high iron loss. In this case, preferably, the non-oriented electrical steel sheet is punched out and laminated to manufacture a motor core and strain relief annealing is then performed only on the stator core. In the stator core that has been subjected to strain relief annealing, since recrystallization and grain growth proceed and the iron loss is reduced, it is possible to significantly improve motor efficiency.

Hereinafter, the present invention will be described in detail with reference to examples, but the conditions in the examples only indicate that they are examples used for confirming the feasibility and effects of the present invention, and the present invention is not limited to the conditions of these examples. Various conditions can be used in the present invention without departing from the gist of the present invention as long as the object of the present invention is achieved.

EXAMPLES

Slabs having chemical compositions shown in Table 1 were heated to 1,150° C., and then hot-rolled at a final temperature of 850° C. and a final sheet thickness of 2.0 mm, and wound at 650° C. to obtain a hot-rolled steel sheet. In the obtained hot-rolled steel sheet, without performing hot-band annealing, the scale on the surface was removed by pickling, and primary cold rolling was then performed so that the sheet thickness shown in Table 2 was obtained. Next, the steel sheet after primary cold rolling was subjected to a degreasing treatment, intermediate annealing was then performed at 950° C. for 40 sec to obtain an intermediate annealed sheet. The intermediate annealed sheet was subjected to secondary cold rolling so that the thickness was 0.20 mm to obtain a cold-rolled steel sheet. In addition, in a mixed atmosphere with $H_2$: 15%, $N_2$: 85%, and a dew point of −30° C. shown in Table 2, final annealing was performed at the soaking temperature and the soaking time shown in Table 2. Then, the insulation coating was applied to manufacture a non-oriented electrical steel sheet, which was used as a test material. Here, as shown in Test No. 25, a comparative example in which hot-band annealing was performed under soaking conditions of 950° C. and 80 seconds was performed.

In addition, the above insulation coating was formed by applying a predetermined adhesion amount of an insulation coating composed of aluminum phosphate and an acrylic-styrene copolymer resin emulsion with a particle size of 0.2 μm and baking it in the atmosphere at 350° C.

TABLE 1

| Steel type | Chemical composition (mass %, remainder: Fe and impurities) C | Si | Mn | P | S | sol. Al | N | Ti | Nb | Zr | V | Cu | Ni | Sn | Sb | Middle side value in Formula (i) |
|---|---|---|---|---|---|---|---|---|---|---|---|---|---|---|---|---|
| A | 0.0026 | 3.6 | 0.41 | 0.015 | 0.0008 | 0.45 | 0.0012 | 0.0011 | 0.0009 | 0.0007 | 0.0003 | 0.059 | 0.003 | 0.030 | 0.001 | 4.3 |
| B | 0.0025 | 3.7 | 0.42 | 0.014 | 0.0008 | 0.45 | 0.0012 | 0.0012 | 0.0008 | 0.0007 | 0.0002 | 0.059 | 0.033 | 0.029 | 0.001 | 4.4 |
| C | 0.0026 | 4.0 | 0.30 | 0.015 | 0.0009 | 0.32 | 0.0013 | 0.0013 | 0.0008 | 0.0007 | 0.0018 | 0.060 | 0.035 | 0.029 | — | 4.5 |
| D | 0.0020 | 4.3 | 0.18 | 0.013 | 0.0011 | 0.20 | 0.0015 | 0.0013 | 0.0010 | 0.0008 | 0.0005 | 0.061 | 0.050 | 0.028 | 0.002 | 4.6 |
| E | 0.0028 | 4.6 | 0.11 | 0.012 | 0.0013 | 0.20 | 0.0018 | 0.0016 | 0.0007 | 0.0004 | 0.0001 | 0.012 | 0.012 | 0.002 | 0.002 | 4.9 |
| F | 0.0025 | 4.7 | 0.43 | 0.013 | 0.0010 | 0.10 | 0.0015 | 0.0016 | 0.0008 | 0.0004 | 0.0006 | 0.012 | 0.013 | 0.013 | 0.001 | 5.0 |
| G | 0.0024 | 4.4 | 0.59 | 0.015 | 0.0010 | 0.21 | 0.0014 | 0.0015 | 0.0007 | 0.0011 | 0.0009 | 0.007 | 0.005 | 0.030 | 0.003 | 4.9 |
| H | 0.0026 | 4.3 | 0.40 | 0.019 | 0.0012 | 0.40 | 0.0016 | 0.0014 | 0.0009 | 0.0010 | 0.0007 | 0.045 | 0.033 | 0.035 | — | 4.9 |
| I | 0.0025 | 4.3 | 0.23 | 0.018 | 0.0012 | 0.50 | 0.0015 | 0.0014 | 0.0008 | 0.0009 | 0.0008 | 0.040 | 0.035 | 0.036 | 0.002 | 4.9 |
| J | 0.0023 | 4.2 | 0.35 | 0.015 | 0.0010 | 0.29 | 0.0016 | 0.0014 | 0.0007 | 0.0008 | 0.0007 | 0.012 | 0.029 | 0.005 | 0.019 | 4.7 |
| K | 0.0020 | 4.4 | 0.18 | 0.008 | 0.0008 | 0.21 | 0.0012 | 0.0010 | 0.0006 | 0.0007 | 0.0007 | 0.006 | 0.012 | 0.022 | 0.001 | 4.7 |
| L | 0.0024 | 4.8 | 0.10 | 0.013 | 0.0010 | 0.10 | 0.0014 | 0.0015 | 0.0007 | 0.0008 | 0.0006 | 0.012 | 0.015 | 0.020 | 0.001 | 5.0 |
| M | 0.0025 | 4.2 | 0.29 | 0.015 | 0.0015 | 0.32 | 0.0015 | 0.0015 | 0.0014 | 0.0006 | 0.0009 | 0.059 | 0.033 | 0.025 | 0.001 | 4.7 |
| N | 0.0026 | 4.6 | 0.21 | 0.013 | 0.0007 | 0.22 | 0.0012 | 0.0011 | 0.0006 | 0.0005 | 0.0004 | 0.013 | 0.085 | 0.012 | 0.013 | 4.9 |
| O | 0.0025 | 3.7 | 0.44 | 0.014 | 0.0012 | 0.24 | 0.0015 | 0.0014 | 0.0008 | 0.0004 | 0.0003 | 0.012 | 0.033 | 0.025 | — | 4.2 |
| P | 0.0028 | 4.0 | 0.04 | 0.016 | 0.0014 | 0.35 | 0.0014 | 0.0013 | 0.0010 | 0.0008 | 0.0005 | 0.061 | 0.048 | 0.022 | 0.002 | 4.4 |
| Q | 0.0024 | 4.1 | 0.42 | 0.015 | 0.0011 | 0.04 | 0.0015 | 0.0011 | 0.0009 | 0.0008 | 0.0007 | 0.010 | 0.012 | 0.025 | — | 4.4 |
| R | 0.0054 | 3.8 | 0.42 | 0.014 | 0.0013 | 0.34 | 0.0019 | 0.0016 | 0.0008 | 0.0010 | 0.0007 | 0.015 | 0.025 | 0.022 | 0.001 | 4.4 |
| S | 0.0015 | 4.0 | 0.07 | 0.015 | 0.0004 | 0.35 | 0.0016 | 0.0020 | 0.0015 | 0.0014 | 0.0011 | 0.150 | 0.352 | 0.055 | 0.002 | 4.4 |
| T | 0.0010 | 4.2 | 0.35 | 0.008 | 0.0005 | 0.06 | 0.0033 | 0.0038 | 0.0006 | 0.0036 | 0.0005 | 0.101 | 0.153 | 0.010 | 0.005 | 4.4 |
| U | 0.0033 | 3.9 | 0.32 | 0.010 | 0.0010 | 0.38 | 0.0009 | 0.0012 | 0.0038 | 0.0010 | 0.0041 | 0.013 | 0.215 | 0.001 | 0.057 | 4.4 |
| V | 0.0020 | 4.2 | 0.28 | 0.013 | 0.0008 | 0.33 | 0.0014 | 0.0010 | 0.0008 | 0.0009 | 0.0017 | 0.026 | 0.022 | 0.110 | — | 4.7 |
| W | 0.0021 | 4.1 | 0.25 | 0.014 | 0.0010 | 0.35 | 0.0015 | 0.0015 | 0.0006 | 0.0008 | 0.0007 | 0.026 | 0.020 | 0.001 | 0.115 | 4.6 |

$4.3 \leq Si + Al + 0.5 \times Mn \leq 4.9$ . . . (i)

The underlines indicate outside the scope of the present invention.

TABLE 2

| Test No. | Steel type | Sheet thickness after primary cold rolling (mm) | Final annealing conditions Soaking temperature (° C.) | Soaking time (sec) | Dew point (° C.) | Recrystallization rate (%) | Tensile strength (MPa) | Average $W_{10/400}$ of the entire circumference (W/kg) | Average $B_{50}$ of the entire circumference (T) | Note |
|---|---|---|---|---|---|---|---|---|---|---|
| 1 | A | 0.7 | 720 | 20 | −30 | 40 | 694 | 24.6 | 1.60 | Comparative Example |
| 2 | B | 0.7 | 720 | 20 | −30 | 38 | 705 | 24.5 | 1.60 | Invention Example |
| 3 | C | 0.7 | 690 | 20 | −30 | 12 | 798 | 31.5 | 1.56 | Comparative Example |
| 4 | C | 0.7 | 710 | 20 | −30 | 32 | 751 | 24.9 | 1.57 | Invention Example |
| 5 | C | 0.7 | 740 | 20 | −30 | 49 | 720 | 22.8 | 1.59 | Invention Example |
| 6 | D | 0.7 | 740 | 20 | −30 | 52 | 736 | 21.9 | 1.59 | Invention Example |
| 7 | D | 0.7 | 800 | 20 | −30 | 97 | 703 | 16.5 | 1.59 | Invention Example |
| 8 | D | 0.7 | 810 | 20 | −30 | 100 | 698 | 16.0 | 1.59 | Comparative Example |
| 9 | E | 0.7 | 760 | 20 | −30 | 64 | 737 | 18.0 | 1.57 | Invention Example |
| 10 | F | 0.7 | 760 | 20 | −30 | 66 | 756 | 19.2 | 1.55 | Comparative Example |
| 11 | G | 0.7 | 760 | 20 | −30 | 63 | 726 | 19.5 | 1.56 | Comparative Example |
| 12 | H | 0.7 | 780 | 20 | −30 | 92 | 730 | 18.2 | 1.58 | Invention Example |
| 13 | I | 0.7 | broken after secondary cold rolling | | | | | | | Comparative Example |
| 14 | J | 0.7 | 780 | 20 | −30 | 90 | 711 | 22.5 | 1.59 | Invention Example |
| 15 | K | 0.7 | 800 | 20 | −30 | 95 | 722 | 16.3 | 1.59 | Invention Example |
| 16 | L | 0.7 | broken after secondary cold rolling | | | | | | | Comparative Example |
| 17 | M | 1.1 | broken after secondary cold rolling | | | | | | | Comparative Example |
| 18 | M | 1.0 | 770 | 20 | −30 | 80 | 720 | 21.6 | 1.59 | Invention Example |
| 19 | M | 0.8 | 770 | 20 | −30 | 82 | 718 | 21.4 | 1.59 | Invention Example |

TABLE 2-continued

| Test No. | Steel type | Sheet thickness after primary cold rolling (mm) | Final annealing conditions Soaking temperature (° C.) | Soaking time (sec) | Dew point (° C.) | Recrystallization rate (%) | Tensile strength (MPa) | Average $W_{10/400}$ of the entire circumference (W/kg) | Average $B_{50}$ of the entire circumference (T) | Note |
|---|---|---|---|---|---|---|---|---|---|---|
| 20 | M | 0.6 | 770 | 20 | −30 | 78 | 717 | 21.3 | 1.58 | Invention Example |
| 21 | N | 0.7 | 780 | 20 | −30 | 91 | 750 | 16.0 | 1.57 | Invention Example |
| 22 | O | 0.7 | 720 | 20 | −30 | 35 | 695 | 28.8 | 1.61 | Comparative Example |
| 23 | P | 0.7 | 740 | 20 | −30 | 50 | 708 | 26.0 | 1.59 | Comparative Example |
| 24 | Q | 0.7 | 740 | 20 | −30 | 48 | 706 | 25.8 | 1.59 | Comparative Example |
| 25 | D | | | broken after secondary cold rolling | | | | | | Comparative Example |
| 26 | R | 0.8 | 720 | 10 | −30 | 35 | 711 | 28.2 | 1.59 | Comparative Example |
| 27 | S | 0.8 | 740 | 5 | −10 | 41 | 725 | 23.0 | 1.59 | Invention Example |
| 28 | T | 0.8 | 740 | 100 | −20 | 60 | 722 | 22.6 | 1.59 | Invention Example |
| 29 | U | 0.8 | 760 | 10 | 10 | 61 | 710 | 22.5 | 1.60 | Invention Example |
| 30 | V | 0.8 | | | broken after secondary cold rolling | | | | | Comparative Example |
| 31 | W | 0.8 | | | broken after secondary cold rolling | | | | | Comparative Example |

The underlines indicate a value outside of the scope of the present invention

For the obtained test materials, Epstein test pieces were collected in the rolling direction, the direction 45° from the rolling direction and the direction 90° from the rolling direction, and magnetic characteristics (the iron loss $W_{10/400}$ and the magnetic flux density $B_{50}$) in the directions were evaluated by the Epstein test according to JIS C 2550-1 (2011). If the average iron loss $W_{10/400}$ of the entire circumference was 25.0 W/kg or less and the average magnetic flux density $B_{50}$ of the entire circumference was 1.57 T or more, it was determined satisfactory because magnetic characteristics were excellent. If this condition was not satisfied, it was determined unsatisfactory because magnetic characteristics were poor. Here, this satisfactory condition was set because the final sheet thickness of the cold-rolled material of each test material was 0.20 mm or less.

In addition, JIS No. 5 tensile test pieces were collected from the test materials according to JIS Z 2241 (2011) so that the longitudinal direction matched the rolling direction of the steel sheet. Then, the tensile test was performed using the above test piece according to JIS Z 2241 (2011), and the tensile strength was measured. If the tensile strength was more than 700 MPa, it was determined satisfactory because the tensile test had high strength. If the tensile strength was 700 MPa or less, it was determined unsatisfactory because the strength was poor. Here, the average crystalline grain size of recrystallized grains of each test material was about 10 μm to 30 μm.

The results of the Epstein test and the tensile test are shown in Table 2 together. Here, the underlines in Table 1 and Table 2 indicate compositions outside the scope of the present invention. In addition, "-" in the chemical composition table shown in Table 1 indicates that a corresponding element content was 0% in a specified significant digit (numerical value to the least significant digit) in the present embodiment.

In the test Nos. 2, 4 to 7, 9, 12, 14, 15, 18 to 21 and 27 to 29 in which the chemical composition and manufacturing conditions of the steel sheet satisfied the regulation of the present invention, it was found that the average iron loss of the entire circumference was low, the average magnetic flux density of the entire circumference was high, and the sheet had a high tensile strength of more than 700 MPa.

On the other hand, in the test Nos. 1, 3, 8, 10, 11, 13, 16, 17, 22 to 24, 25, 26, 30 and 31 as comparative examples, at least one of magnetic characteristics and tensile strength was poor, the toughness significantly deteriorated, and manufacturing was difficult.

Specifically, in the Test No. 1, since the Si content was lower than a specified range, the tensile strength was poor in the results. In addition, in the Test No. 3, since the soaking temperature in the final annealing was lower than a specified range, the iron loss and the magnetic flux density were poor in the results. In the Test No. 8, since the final annealing temperature was higher than a specified range, the recrystallization rate was 100%, and the tensile strength was poor in the results.

In the Test No. 10, Formula (i) was not satisfied, and the magnetic flux density was poor in the results. In addition, in the test number 11, since the Mn content was more than a specified range, the magnetic flux density was poor in the results.

In the Test No. 13, the sol. Al content was more than a specified range, in the Test No. 16, Formula (i) was not satisfied, in the Test No. 17, the sheet thickness after primary cold rolling was more than a specified range, and additionally, in the Test No. 30, the Sn content was more than a specified range, and in the Test No. 31, the Sb content was more than a specified range, and thus the toughness deteriorated, breakage occurred during secondary cold rolling, and the tensile strength and magnetic characteristics could not be measured. In the Test No. 25, since hot-band annealing was performed, breakage occurred during primary cold rolling, and the tensile strength and magnetic characteristics could not be measured.

In the Test No. 22, Formula (i) was not satisfied, and the tensile strength and the iron loss were poor in the results. In the Test No. 23, the Mn content was lower than a specified range, and in the Test No. 24, the Al content was lower than a specified range, and thus the iron loss was poor in the results in all cases.

INDUSTRIAL APPLICABILITY

As described above, according to the present invention, it is possible to obtain a non-oriented electrical steel sheet having high strength and excellent magnetic characteristics.

What claims is:

1. A non-oriented electrical steel sheet comprising a base material having a chemical composition including, in mass %, C: 0 to 0.0050%, Si: 4.2 to 4.8%, Mn: 0.05% or more and less than 0.50%, sol. Al: 0.05 to 0.45%, P: 0 to 0.030%,
S: 0 to 0.0030%,
N: 0 to 0.0040%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0 to 0.100%,
Sb: 0 to 0.100%, and
the remainder: Fe and impurities,
wherein a recrystallization rate is 20% or more and less than 100% in terms of an area fraction,
the following Formula (i) and Formula (ii) are satisfied,
a tensile strength of the non-oriented electrical steel sheet is more than 700 MPa, and
a sheet thickness of the non-oriented electrical steel sheet is 0.10 to 0.30 mm:

$$4.3 \leq Si + sol.\ Al + 0.5 \times Mn \leq 4.9 \quad (i)$$

where, element symbols in the formula indicate the content (mass %) of the elements:

$$(B_{50}(0°) + 2 \times B_{50}(45°) + B_{50}(90°))/4 \geq 1.57 \quad (ii)$$

where, in Formula (ii), $B_{50}$ (0°) is a magnetic flux density (T) at a magnetizing force of 5,000 A/m in a rolling direction, $B_{50}$ (45°) is a magnetic flux density (T) at a magnetizing force of 5,000 A/m in the direction 45° from the rolling direction, and $B_{50}$ (90°) is a magnetic flux density (T) at a magnetizing force of 5,000 A/m in the direction 90° from the rolling direction.

2. The non-oriented electrical steel sheet according to claim 1,
wherein the chemical composition contains, in mass %, one or two of
Sn: 0.005 to 0.100%, and
Sb: 0.005 to 0.100%.

3. The non-oriented electrical steel sheet according to claim 1,
wherein the base material has an insulation coating on its surface.

4. A method for manufacturing the non-oriented electrical steel sheet according to claim 1, comprising:
performing, on a steel ingot having a chemical composition satisfying the following Formula (i), which includes, in mass %,
C: 0 to 0.0050%,
Si: 4.2 to 4.8%,
Mn: 0.05% or more and less than 0.50%,
sol. Al: 0.05 to 0.45%,
P: 0 to 0.030%,
S: 0 to 0.0030%,
N: 0 to 0.0040%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0 to 0.100%,
Sb: 0 to 0.100%, and
the remainder: Fe and impurities,
a hot rolling process;
a primary cold rolling process in which a sheet thickness is reduced to 1.0 mm or less;
an intermediate annealing process;
a secondary cold rolling process; and
a final annealing process with a soaking temperature of 700 to 800° C. and a soaking time of 1 to 300 sec, in that order;
wherein, after the hot rolling process, hot-band annealing is not performed:

$$4.3 \leq Si + sol.\ Al + 0.5 \times Mn \leq 4.9 \quad (i)$$

where, element symbols in the formula indicate the content (mass %) of the elements.

5. The non-oriented electrical steel sheet according to claim 2,
wherein the base material has an insulation coating on its surface.

6. A method for manufacturing the non-oriented electrical steel sheet according to claim 2, comprising:
performing, on a steel ingot having a chemical composition satisfying the following Formula (i), which includes, in mass %,
C: 0 to 0.0050%,
Si: 4.2 to 4.8%,
Mn: 0.05% or more and less than 0.50%,
sol. Al: 0.05 to 0.45%,
P: 0 to 0.030%,
S: 0 to 0.0030%,
N: 0 to 0.0040%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0.005 to 0.100%,
Sb: 0.005 to 0.100%, and
the remainder: Fe and impurities,
a hot rolling process;
a primary cold rolling process in which a sheet thickness is reduced to 1.0 mm or less;
an intermediate annealing process;
a secondary cold rolling process; and
a final annealing process with a soaking temperature of 700 to 800° C. and a soaking time of 1 to 300 sec, in that order;
wherein, after the hot rolling process, hot-band annealing is not performed:

$$4.3 \leq Si + sol.\ Al + 0.5 \times Mn \leq 4.9 \quad (i)$$

where, element symbols in the formula indicate the content (mass %) of the elements.

7. A method for manufacturing the non-oriented electrical steel sheet according to claim 3, comprising:
performing, on a steel ingot having a chemical composition satisfying the following Formula (i), which includes, in mass %,
C: 0 to 0.0050%,
Si: 4.2 to 4.8%,
Mn: 0.05% or more and less than 0.50%,
sol. Al: 0.05 to 0.45%,
P: 0 to 0.030%,
S: 0 to 0.0030%,
N: 0 to 0.0040%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%, Sn: 0 to 0.100%,
Sb: 0 to 0.100%, and
the remainder: Fe and impurities,
a hot rolling process;
a primary cold rolling process in which a sheet thickness is reduced to 1.0 mm or less;
an intermediate annealing process;
a secondary cold rolling process; and
a final annealing process with a soaking temperature of 700 to 800° C. and a soaking time of 1 to 300 sec, in that order;
wherein, after the hot rolling process, hot-band annealing is not performed:

$$4.3 \leq Si+sol.\ Al+0.5 \times Mn \leq 4.9 \quad (i)$$

where, element symbols in the formula indicate the content (mass %) of the elements.

8. A method for manufacturing the non-oriented electrical steel sheet according to claim 5, comprising:
performing, on a steel ingot having a chemical composition satisfying the following Formula (i), which includes, in mass %,
C: 0 to 0.0050%,
Si: 4.2 to 4.8%,
Mn: 0.05% or more and less than 0.50%,
sol. Al: 0.05 to 0.45%,
P: 0 to 0.030%,
S: 0 to 0.0030%,
N: 0 to 0.0040%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0.005 to 0.100%,
Sb: 0.005 to 0.100%, and
the remainder: Fe and impurities,
a hot rolling process;
a primary cold rolling process in which a sheet thickness is reduced to 1.0 mm or less;
an intermediate annealing process;
a secondary cold rolling process; and
a final annealing process with a soaking temperature of 700 to 800° C. and a soaking time of 1 to 300 sec, in that order;
wherein, after the hot rolling process, hot-band annealing is not performed:

$$4.3 \leq Si+sol.\ Al+0.5 \times Mn \leq 4.9 \quad (i)$$

where, element symbols in the formula indicate the content (mass %) of the elements.

* * * * *